US012795562B2

(12) United States Patent
Tanwar et al.

(10) Patent No.: US 12,795,562 B2
(45) Date of Patent: Nov. 10, 2026

(54) METHOD AND APPARATUS TO REQUEST AND GRANT TIMING AND SYNCHRONISATION SERVICES ON DEMAND

(71) Applicant: Cisco Technology, Inc., San Jose, CA (US)

(72) Inventors: Anshul Tanwar, Bengaluru (IN); Kumaril Kapoor, Bengaluru (IN); Shyamsundar N. Maniyar, San Jose, CA (US); Praveen Ganjam Ramesh, Bengaluru (IN)

(73) Assignee: Cisco Technology, Inc., San Jose, CA (US)

( * ) Notice: Subject to any disclaimer, the term of this patent is extended or adjusted under 35 U.S.C. 154(b) by 312 days.

(21) Appl. No.: 18/421,467

(22) Filed: Jan. 24, 2024

(65) Prior Publication Data

US 2025/0240740 A1 Jul. 24, 2025

(51) Int. Cl.
*H04W 56/00* (2009.01)
*H04W 84/10* (2009.01)

(52) U.S. Cl.
CPC .......... *H04W 56/00* (2013.01); *H04W 84/105* (2013.01)

(58) Field of Classification Search
CPC .. H04W 56/00; H04W 84/105; H04W 56/001
See application file for complete search history.

(56) References Cited

U.S. PATENT DOCUMENTS 9,853,949 B1 * 12/2017 Stickle .................. G06F 21/606
11,115,142 B1 9/2021 Ozarkar et al.
2007/0058812 A1 * 3/2007 Ali ........................ H04L 9/3271 380/274
2015/0207579 A1 7/2015 Chapman et al.
2016/0277262 A1 * 9/2016 Santuka .............. H04L 41/0893
2019/0007151 A1 1/2019 Goel et al.
2022/0361120 A1 11/2022 Kim et al.

OTHER PUBLICATIONS

Cisco Systems Inc: "Timing and Synchronization Configuration Guide, Cisco IOS XE 16 (Cisco ASR 920 Routers)", First Published on May 5, 2017, Last Modified on Apr. 17, 2020, 124 pages.
"IEEE Standard for a Precision Clock Synchronization Protocol for Networked Measurement and Control Systems", IEEE Standards Association, IEEE Instrumentation and Measurement Society, IEEE Std 1588™—2019 (Revision of IEEE Std 1588-2008), Nov. 7, 2019, 499 pages.

* cited by examiner

*Primary Examiner* — Marisol Figueroa
(74) *Attorney, Agent, or Firm* — Baker Botts L.L.P.

(57) ABSTRACT

In an embodiment, a method for establishing timing and synchronization services for a private fifth-generation (5G) deployment. The method includes sending, by a local device, a request to a first source of timing and synchronization services and a second source of timing and synchronization services. The first source and second source are connected to the local device, and the local device receives a first offer for timing and synchronization services from the first source and a second offer for timing and synchronization services from the second source. After receiving the first and second offers, the local device compares the first and second offers to predetermined metrics. Then, the local device requests that the first source provide the timing and synchronization services. The local device then receives the timing and synchronization services from the first source.

20 Claims, 4 Drawing Sheets

METHOD AND APPARATUS TO REQUEST AND GRANT TIMING AND SYNCHRONISATION SERVICES ON DEMAND

TECHNICAL FIELD

The present disclosure generally relates to private fifth-generation (5G) networks and, more particularly, to a method and apparatus to request and grant timing and synchronization services on demand.

BACKGROUND

Organizations have increasingly utilized private 5G networks. Private 5G networks are nonpublic mobile networks using licensed, unlicensed, or shared spectrum. Private 5G networks provide wireless connectivity that can cover from a few meters to dozens of square kilometers. Private 5G networks provide organizations with low latency, high bandwidth, and seamless, secure wireless connectivity. Like public mobile networks, there are extensive requirements for private 5G networks to adequately provide and support a particular organization's needs.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems and components depicted in the accompanying figures are not to scale, and components within the figures may be depicted not to scale with each other.

DESCRIPTION OF EXAMPLE EMBODIMENTS

Overview

Figure 1:
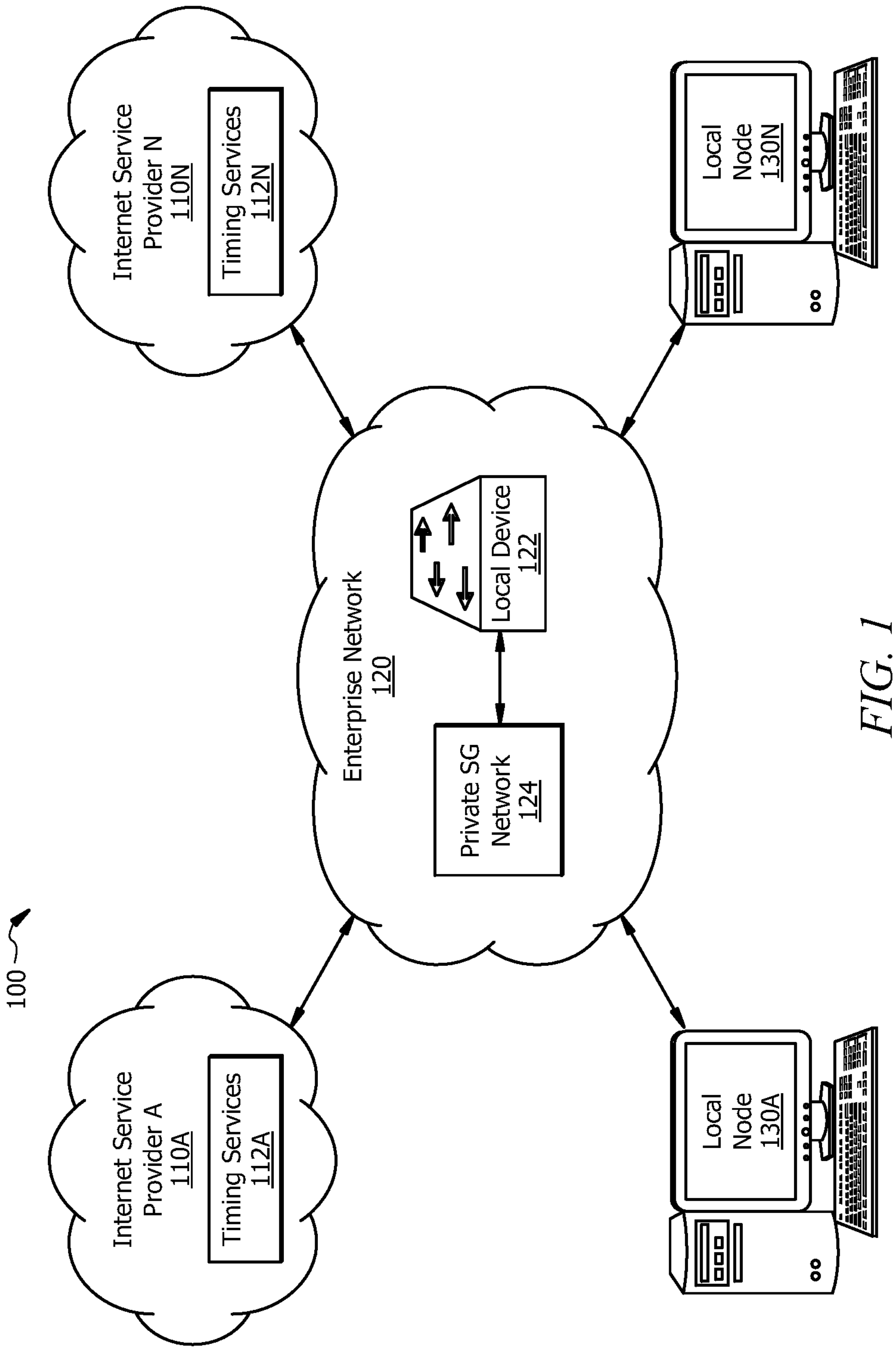
FIG. 1 illustrates a system for providing timing and synchronization services in accordance with at least one embodiment.

According to an embodiment, a method for establishing timing and synchronization services for a private fifth-generation (5G) deployment is provided. The method includes sending by a local device a request to a first source of timing and synchronization services and a second source of timing and synchronization services to which the local device is connected. The method further includes receiving, by the local device, a first offer for timing and synchronization services from the first source and a second offer for timing and synchronization services from the second source. The method also includes comparing, by the local device, the first offer and the second offer to predetermined metrics and requesting, by the local device, that the first source provide the timing and synchronization services. Once the first offer and second offer are compared, the method begins receiving, by the local device, the timing and synchronization services from the first source.

According to another embodiment, the disclosure describes a local device that is connected to one or more 5G base stations. The local device comprises one or more processors and one or more computer-readable non-transitory storage media couple to the one or more processors. The one or more computer-readable non-transitory storage media store instructions operable, when executed by one or more processors, to cause the system to perform operations for establishing timing and synchronization services. The operations include sending by a local device a request to a first source of timing and synchronization services and a second source of timing and synchronization services to which the local device is connected. The operations further include receiving, by the local device, a first offer for timing and synchronization services from the first source and a second offer for timing and synchronization services from the second source. The operations also include comparing, by the local device, the first offer and the second offer to predetermined metrics and requesting, by the local device, that the first source provides the timing and synchronization services. Once the first and second offers are compared, the operations cause the local device to begin receiving the timing and synchronization services from the first source.

According to yet another embodiment, the disclosure also describes at least one or more computer-readable non-transitory storage media embodying instructions that, when executed by a processor, cause the processor to perform operations. The operations include sending by a local device a request to a first source of timing and synchronization services and a second source of timing and synchronization services to which the local device is connected. The operations further include receiving, by the local device, a first offer for timing and synchronization services from the first source and a second offer for timing and synchronization services from the second source. The operations also include comparing, by the local device, the first offer and the second offer to predetermined metrics and requesting, by the local device, that the first source provides the timing and synchronization services. Once the first and second offers are compared, the operations cause the local device to begin receiving the timing and synchronization services from the first source.

According to an embodiment, the at least two different sources of timing and synchronization are provided either by a common internet services provider (ISP) or by a first ISP and a second ISP. The at least one external ISP may be connected to the local device over a wired or optical connection. The local device may be a router, switch, or wireless controller.

The method and/or operations may further include periodic monitoring, by the local device, a quality of the timing and synchronization services being provided by the first source. The method then comprises determining, by the local device, that the timing and synchronization services provided by the first source no longer satisfy quality-of-service requirements. Once the determination is made the first source no longer satisfies quality-of-service requirements, the method then causes the local device to send the request to the first source, the second source, and a third source in response to determining that the timing and synchronization services provided by the first source no longer satisfy quality-of-service requirements.

Technical advantages of certain embodiments of this disclosure may include one or more of the following. Certain systems and methods described herein may allow for providing timing and synchronization to a private 5G network. The timing and synchronization may be obtained from external or third-party ISPs, which are selected based on their ability to meet predetermined metrics, such as, but not limited to, quality, cost, and stability. Further, the specific ISP and/or timing and synchronization service may be changed or selected dynamically based on current needs, requirements, and other criteria. By using the external ISP or other external source for the timing and synchronization service, an enterprise or organization may obtain the service that meets their needs without having to employ internal sources of timing and synchronization such as high-precision GPS systems, resulting in lower costs both financially and technically for deploying the private 5G network.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

The present disclosure describes an approach that allows for efficiently selecting and using an external source, such as, but not limited to, an internet service provider to provide timing and synchronization services for use with a private 5G deployment or similar network. Computer networks and devices, in general, require accurate sources of timing. In some embodiments, this may be provided using Precision Time Protocol (PTP) packets defined under IEEE 1588-v2. The PTP packets provide real-time clocks to connected devices.

PTP is a protocol used to synchronize clocks through a computer network. It is capable of achieving clock accuracy that is in the sub-microsecond range and is suitable for measurement and control systems as well as a variety of other applications. In the PTP protocol, timing and synchronization are distributed using a hierarchical architecture (host-client) for clock distribution. Time distribution consists of one or more network segments and one or more clocks. A root-trimming reference called the grandmaster transmits synchronization information to the clocks residing on the network segments. Boundary clocks relay accurate time to other clocks and/or segments, resulting in the connected clocks becoming accurate within a threshold amount, such as, but not limited to, a sub-microsecond range.

The timing references are often obtained by utilizing one or more high-precision GPS or similar global navigation satellite systems (GNSS). However, using these high-precision GPS receivers requires expensive receivers and/or skilled technicians to set them up and configure them. Integrating the high-precision GPS receivers into the local or enterprise network is also not trivial. The various aspects of this disclosure overcome these limitations by obtaining precision timing and synchronization services from internet service providers (ISPs) already connected to the private 5G deployment and/or other networks of the enterprise.

Often, these service providers can provide timing and synchronization that is as accurate and precise (or more) as those that may be obtained from high-precision GPS receivers. This is because many ISPs also support public 5G cellular networks or similar deployments and already have their own highly accurate timing and synchronization systems. In accordance with embodiments of this disclosure, these ISPs may then provide their preexisting timing and synchronization services through their physical connections (such as coaxial or optical connections) to the private 5G network, giving the ISP a potential new revenue stream while saving the local enterprise and/or organization the costs of establishing their own accurate timing and synchronization services.

The various aspects may be implemented in many different forms and should not be construed as limited to the implementations set forth herein. The disclosure encompasses variations of the embodiments as described herein. Like numbers refer to like elements throughout.

FIG. 1 illustrates a diagram of a system 100 for providing timing services to an enterprise network 120. System 100 includes at least one internet service provider, e.g., 110A, an enterprise network 120, and one or more local nodes, e.g., 130A. The system 100 may include more or fewer devices than that shown in FIG. 1. Each of these components may be virtual, and/or one or more may be implemented by a stand-alone server or computational device configured to execute one or more stored instructions, such as those described with regards to FIG. 4.

The various devices and components of the system 100 may be connected to each other using one or more networks, including the enterprise network 120. In some examples, the enterprise network 120 may include a local device 122 and a private 5G network 124. The network(s) may include additional devices and/or types such as any combination of personal area networks (PANs), local area networks (LANs), campus area networks (CANs), metropolitan area networks (MANs), extranets, intranets, the Internet, short-range wireless communication networks (e.g., ZigBee, Bluetooth, etc.), wide area networks (WANs)—both centralized and/or distributed—and/or any combination permutation, and/or aggregation thereof. The enterprise network 120 may include devices, virtual resources, or other nodes that relay packets from one network segment to another by nodes in the computer network. The enterprise network 120 may include multiple devices that utilize the network layer (and/or session layer, transport layer, etc.) in the OSI model for packet forwarding and/or other layers. The network may include various hardware devices, such as routers, switches, gateways, network interfaces (NICs), application-specific integrated circuits (ASICs), field-programmable gate arrays (FPGAs), servers, and/or any other type of devices. Further, the network may include virtual resources, such as virtual machines (VMs), containers, and/or other virtual resources. Additionally, or alternately, the techniques described herein are applicable to container technology, such as Docker®, Kubernetes®, and so forth.

The enterprise network 120 may include a local device 122. The local device 122, in one or more embodiments, may take the form of a router, switch, or wireless controller. The local device 122 may receive packets from one or more ISPs 110A-110N and forward them to the appropriate local node 130A-130N using the private 5G network 124 and/or other connections (not shown). In certain embodiments, the local device 122 provides timing and synchronization services to one or more local nodes 130A-130N and/or one or more components of the private 5G network 124. As will be discussed below, these timing and synchronization services may be obtained from one or more ISPS 110A-110N.

The local device 122 may be connected to a private 5G network 124. The private 5G network 124 may include an on-site Radio Access Network (RAN, not shown), 5G radios, and base stations, as well as any other equipment needed, such as antennas and receivers, to provide 5G service to one or more local nodes 130A-130N. The 5G network 124 may work with other networking devices and/or systems of the enterprise network 120. The 5G network 124 may forward or provide timing and synchronization services to one or more local nodes 130A-130N.

The local nodes 130A-130N may be any computational device that connects to the enterprise network 120. The local nodes 130A-130N may be workstations, kiosks, computers, sensors, and/or other computational devices. The local nodes 130A-130N may take any form configured to execute one or more stored instructions. The local nodes 130A-130N may be in the form of a computational device 400 as described with regards to FIG. 4. One or more of the local nodes 130A-130N may require precision timing and/or synchronization services.

The enterprise network 120, in one or more embodiments, is connected to one or more internet service providers (ISPs) 110A-110N. The ISPs may be preexisting providers connected to the enterprise network 120 utilizing wired, optical, or other connection means. They may provide various levels of Internet and network services. There may be a single ISP e.g., 110A, or a plurality of ISPs 112A-112N that provide various levels of service to the enterprise network 120 and devices connected thereto. In one or more embodiments, the ISPs 110A-110N also provide timing services 112A-112N. Alternatively, the timing services 112A may be provided by other entities that are connected to the enterprise network 120, and the disclosure is not limited to having the ISPs 110A-110N proving the timing services 112A-112N.

Each of the ISPs 110A-110N may provide one or more types of timing services 112A-112N to the enterprise network 120. A single or common ISP, e.g., 110A, may provide multiple types of timing services 112A-112N, or each ISP 110A-110N may provide a single timing service 112A-112N, other combinations of ISPs 110A-110N and timing services 112A-112N may be used without departing from the disclosure. These services may have various levels of quality, such as, but not limited to, accuracy or precision, drift, and/or pricing. The local device 122 negotiates with the timing services 112A-112N to determine which timing service to use as will be described in more detail below and with regards to FIGS. 2 and 3.

The local device 122 and/or other devices associated with the enterprise, periodically sends a request to each of the ISPs 110A-110N and/or each of the timing services 112A-112N. The local device 122 then receives an offer for providing timing and synchronization services from at least two timing services 112A-112N and/or ISPs 110A-110N. The offer may detail various metrics for the service, such as, but not limited to, price, drift, and precision.

The local device compares these offers to predetermined metrics. These predetermined metrics may be determined by a user, administrator, and/or may be determined automatically based on the needs of the private 5G network 124 and/or the local nodes 130A-130N. For example, in a non-limiting example, suppose that the local nodes 130A-130N are high-precision sensors for monitoring a chemical or biological activity that occurs over a time period of less than a second; it may be desirable to have high accuracy timing and synchronization. In contrast, if the local nodes 130A-130N are for sensors that monitor an environment over a period of days or even years, it may be more important that the timing and synchronization services have less drift. Other considerations, for example, may be the service's total cost. Further, over time, the needs of the system 100 and/or budget may change; this may require re-evaluating the offers as will be described below.

The local device 122, once it receives the offers from the timing services 112A-112N, chooses the best offer by comparing it to the predetermined metrics. Once the best offer is chosen, the local device 122 requests that the particular timing service, e.g., 112A, begin providing the timing and synchronization services to the private 5G network 124. In accordance with some embodiments, the local device 122 periodically monitors the provided timing services, e.g., 112A, to ensure that they are still meeting the predetermined metric. If the timing services, e.g., 112A, have changed and no longer meet the predetermined metric, or if the predetermined metric has changed, the local device may once again request offers from any connected ISPs 110A-110N and choose a timing service 112A-112N to provide the timing and synchronization services to the local device 122 and private 5G network 124.

In operation, the local device 122 sends a request for timing and synchronization services to the one or more internet service providers 110A-110N that it is connected to. These internet service providers 110A-110N then each send one or more offers of timing services 112A-112N to the local device 122. The local device compares a first offer for timing services 112A along with any other offers for timing services 112N to predetermined metrics. The best offer for timing services 112A-112N, is then selected. For example, in a non-limiting example, a first offer for timing services 112A is selected. Once the best offer, such as, but not limited to, the first offer for timing services 112A, is selected by the local device 122, the local device then requests that the internet services provider 110A that is the source of the first offer's timing services 112A, beginning to provide the timing and synchronization services. The selected internet service provider 110A that provides the first offer's timing services 112A then begins providing the timing and synchronization services.

Although FIG. 1 illustrates a particular number of internet service providers 110A-110N, and local nodes 130A-130N as well as a single enterprise network 120, the local device 122, and private 5G networks 124, this disclosure contemplates any suitable number of internet service providers 110A-110N, local nodes 130A-130N, enterprise networks, e.g., 120, local devices e.g., 122, and private 5G networks, e.g., 124, For example, system 100 may include more than one local device 122.

Although FIG. 1 illustrates a particular arrangement of the enterprise network 120, Internet service providers 110A-110N, and local nodes 130A-130N, as well as their constituent components/services such as the timing services 112A-112N, the private 5G network 124 and local device 122, this disclosure contemplates any suitable arrangement of enterprise network 120, Internet service providers 110A-110N, and local nodes 130A-130N as well as their constituent components/services such as the timing services 112A-112N, the private 5G network 124 and local device 122. For example, the local device 122 and private 5G network 124 may be separate from the enterprise network 120 and/or located at one or more locale nodes 130A-130N.

Furthermore, although FIG. 1 describes and illustrates particular components, devices, or systems carrying out particular actions, this disclosure contemplates any suitable combination of any suitable components, devices, or systems carrying out any suitable actions.

Figure 2:
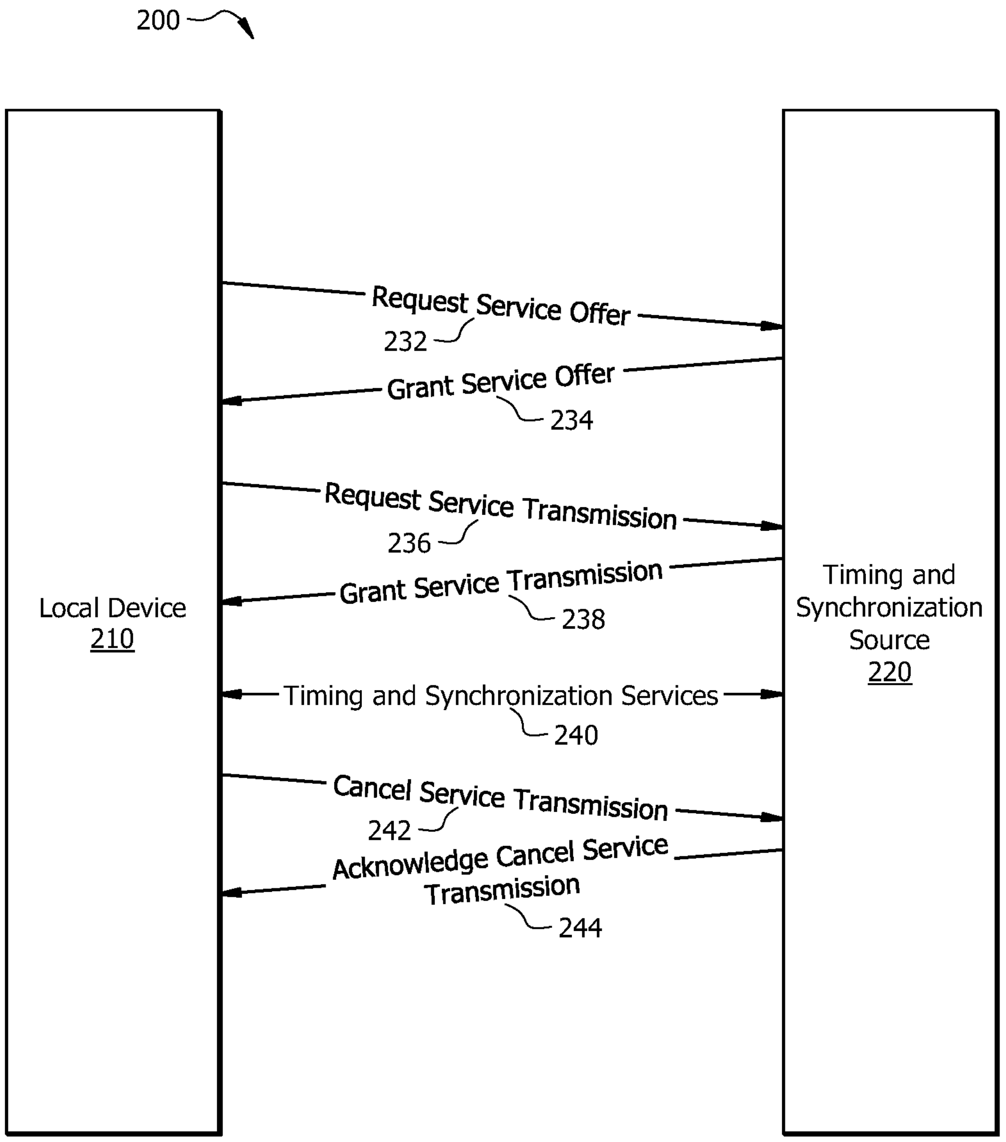
FIG. 2 illustrates a signaling diagram for performing one or more embodiments.

FIG. 2 shows an exemplary signaling 200 between the local device 210 and a particular timing and synchronization source 220. Each of these components may take the form of the components described above with regards to FIG. 1, or any of the components or all of the components described in FIG. 2 may be different than those shown in FIG. 1. Local device 210 may be the same or a different device as that shown in FIG. 1 as local device 122. Similarly, the timing and synchronization source 220 may be any of the timing services, e.g., 112A, shown in FIG. 1.

The local device 210, initially sends a request service offer 232 to the timing and synchronization source 220. This message may have a hex value of 2004 and may take the following form:

TABLE 1

| Bits | | | | | | | | | TLV |
|---|---|---|---|---|---|---|---|---|---|
| 7 | 6 | 5 | 4 | 3 | 2 | 1 | 0 | Octets | Offset |
| tlvType | | | | | | | | 2 | 0 |
| lengthField | | | | | | | | 2 | 2 |
| ptpServiceProfileID | | | | Reserved | | | | 1 | 4 |
| Reserved | | | | | | | | 1 | 5 |

Once the timing and synchronization source 220 receives the request service offer 232, the timing and synchronization source 220 then sends a grant service offer 234 to the local device 210. This message may have a hex value of 2005 and may take the following form:

TABLE 2

| Bits | | | | | | | | | TLV |
|---|---|---|---|---|---|---|---|---|---|
| 7 | 6 | 5 | 4 | 3 | 2 | 1 | 0 | Octets | Offset |
| tlvType | | | | | | | | 2 | 0 |
| lengthField | | | | | | | | 2 | 2 |
| ptpServiceProfileID | | | | Reserved | | | | 1 | 4 |
| grandmasterClockQualityReserved | | | | | | | | 4 | 5 |
| stepsRemoved | | | | | | | | 2 | 9 |
| timeSource | | | | | | | | 1 | 11 |

The local device 210 then chooses a specific timing and synchronization source 220 to provide the timing and synchronization services. The local device 210, then sends a request service transmission 236 to the chosen timing and synchronization source 220. This message may have a hex value of 2006 and may take the following form:

TABLE 3

| Bits | | | | | | | | | TLV |
|---|---|---|---|---|---|---|---|---|---|
| 7 | 6 | 5 | 4 | 3 | 2 | 1 | 0 | Octets | Offset |
| tlvType | | | | | | | | 2 | 0 |
| lengthField | | | | | | | | 2 | 2 |
| ptpServiceProfileID | | | | Reserved | | | | 1 | 4 |

In response to the request service transmission 236, the timing and synchronization source 220 then sends a grant service transmission 238 to the local device 210. The grant service transmission 238 has a hex value of 2007 and may take the following form:

TABLE 4

| Bits | | | | | | | | | TLV |
|---|---|---|---|---|---|---|---|---|---|
| 7 | 6 | 5 | 4 | 3 | 2 | 1 | 0 | Octets | Offset |
| tlvType | | | | | | | | 2 | 0 |
| lengthField | | | | | | | | 2 | 2 |
| ptpServiceProfileID | | | | Reserved | | | | 1 | 4 |
| 0 | 0 | 0 | 0 | 0 | 0 | 0 | R | 1 | 5 |

Once the timing and synchronization source 220 begins providing the timing and synchronization services 240 to the local device 210. The system may proceed according to the protocols outlined in IEEE 1588-v2. The system may send requests that comprise messages such as, but are not limited to, announce grant request, announce grant, sync grant request, sync grant, delay request grant request, delay request grant, and regular packet flow.

After a predetermined time, when a change in either the timing and synchronization services or the required metrics occurs, the local device 210 may then need to renegotiate or restart the timing and synchronization service. The predetermined time may be a set number of minutes, a set number of hours, or a set number of days. For example, in a non-limiting example, resetting the timing and synchronization source every thirty days may be desirable. Other periods may be used without departing from the disclosure.

The local device 210 cancels or re-evaluates the service by first sending a cancel service transmission 242. The cancel service transmission 242 may have a hex value of 2008 and take the following form:

TABLE 5

| Bits | | | | | | | | | TLV |
|---|---|---|---|---|---|---|---|---|---|
| 7 | 6 | 5 | 4 | 3 | 2 | 1 | 0 | Octets | Offset |
| tlvType | | | | | | | | 2 | 0 |
| lengthField | | | | | | | | 2 | 2 |
| ptpServiceProfileID | | | | 0 | 0 | G | R | 1 | 3 |
| Reserved | | | | | | | | 1 | 4 |

When the timing and synchronization source 220 receives the cancel service transmission 242, it then sends an acknowledge cancel service transmission 244 to the local device 210. The system then either shuts down or repeats sending messages 232-238 in order to establish and/or re-establish a timing and synchronization service. The acknowledge cancel service transmission 244 may have a hex value of 2009 and take the following form:

TABLE 6

| Bits | | | | | | | | | TLV |
|---|---|---|---|---|---|---|---|---|---|
| 7 | 6 | 5 | 4 | 3 | 2 | 1 | 0 | Octets | Offset |
| tlvType | | | | | | | | 2 | 0 |
| lengthField | | | | | | | | 2 | 2 |
| ptpServiceProfileID | | | | 0 | 0 | G | R | 1 | 3 |
| Reserved | | | | | | | | 1 | 4 |

The specific hex values and form of the messages sent between the local device 210 and timing and synchronization source 220 may be different than what is described above. The above-described messages are exemplary only, and the disclosure is not limited by them.

Figure 3:
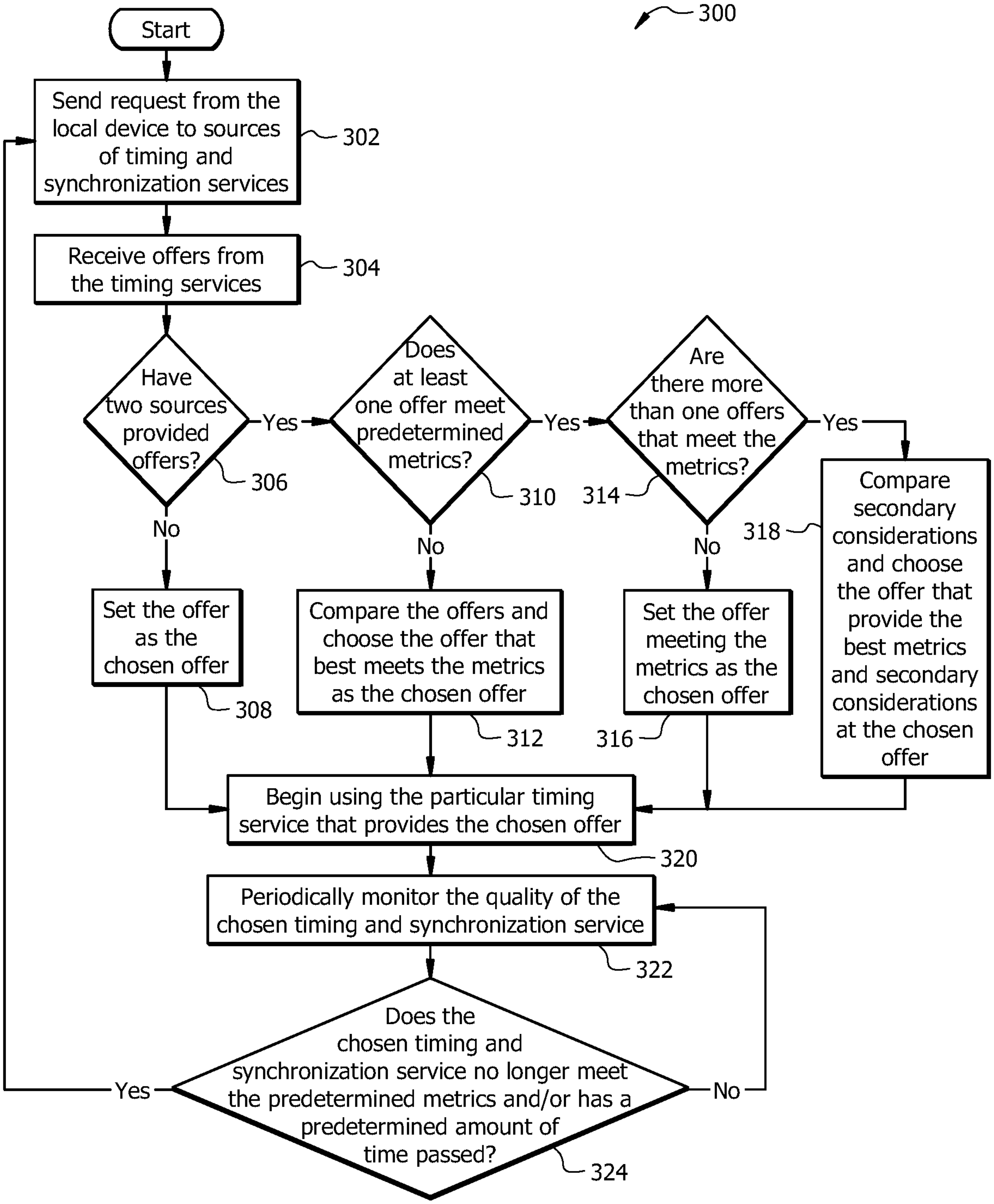
FIG. 3 illustrates a flow diagram of an example method for requesting and granting timing and synchronization services in accordance with at least one embodiment.

FIG. 3 illustrates an exemplary method 300 for choosing a timing and synchronization source and using the chosen source. In one or more embodiments, method 300 is performed by the local device 122 as shown and described above with regards to FIG. 1. In certain embodiments, method 300 may be performed by any system comprising an organizational or enterprise network 120 connected to various timing services 112A-112N and/or ISPs 110A-110N. The method 300 is not limited to being performed by the system shown in FIG. 1 or with the messages and/or signaling as described above with regards to FIG. 2.

Method 300 begins at step 302. In step 302, a request is sent from the local device 122 to each source of timing and synchronization services. The sources may be ISPs 110A-110N and/or their timing services 112A-112N. Alternatively, the sources may be from any source of timing services 112A-112N. Each ISP 110A-110N may host more than one source of timing and synchronization services, and a common ISP, e.g., 110A, may provide at least two different sources of timing and synchronization services. The sources of timing and synchronization may take any form without departing from the disclosure.

The request step 302 may take any form. The request, in some embodiments, may take the form of the request service offer 232 described above with regards to FIG. 2. The request is received by each of the sources of timing and synchronization services.

Once the timing services 112A-112N or other sources of timing and synchronization services receive the request in step 302, the method proceeds to step 304, where the timing services 112A-112N each send their offers to the local device 122. The offers may take the form of a grant service offer 234 as described above with regards to FIG. 2 or a different form. The offers may include such information, for example, as quality-of-service, drift, specific clock source, as well as pricing information and/or other pertinent information required for the local device 122 to make a decision on which source to use. The disclosure is not limited to the specific information described herein, and the offers may take any form without departing from the disclosure.

Once the offers are received in step 304, the method proceeds to step 306, where a determination is made to determine if two sources of timing services 112A-112N have provided offers. If only one source, e.g., 112A, provides an offer, the method proceeds to step 308, and that offer is selected as the chosen offer. However, if two sources do provide offers, the method proceeds from step 306 to step 310.

In step 310, a determination is made to determine if at least one offer meets the predetermined metrics. The predetermined metrics may be determined by a user or administrator of the enterprise network 120 or may be chosen automatically based on criteria specific to the particular private 5G network 124 and/or the local nodes 130A-130N. The metrics may be such things as the desired quality of the grandmaster clock and/or the quality-of-service of the timing and synchronization services in general. It may be related to the precision of the clock, the drift of the clock, and/or other metrics. Alternatively, or in addition, it may be related to the price of the service. For example, in a non-limiting example, the predetermined metrics may be that the clock has a precision within plus or minus one microsecond and costs×number of dollars per hour. Other predetermined metrics may be used without departing from the disclosure.

Returning to step 310, if none of the offers meet the predetermined metrics in step 310, the method proceeds to step 312. In step 312, the offers are compared, and the offer that best meets the metrics is chosen. This may be done by weighting the particular metrics so that certain metrics being met are more important than others. For example, if one offer meets all the technical criteria but is more expensive, it may be chosen despite the price being slightly more than the predetermined metric. Alternatively, when none of the offers meet the predetermined metric, a user or administrator may be alerted and asked to decide. Another method of comparing the offers and choosing the offer that best meets the metrics as the chosen offer in step 312 may be used without departing from the disclosure.

If in step 310, it is determined that at least one of the offers does meet the predetermined metrics, the method proceeds to step 314. In step 314, a determination is made if there is more than one offer that meets the metrics. If only one offer meets the metrics, then in step 316, that offer is set as the chosen offer. If, however, the determination is that more than one offer meets the metrics, the method proceeds to step 318.

In step 318, the method compares any secondary considerations and/or alerts a user or administrator to decide which offer to use. The secondary considerations may be, for example, which offer provides the required level of service at the lowest price or may be additional considerations that were not initially analyzed, for example, if only the precision of the clock was part of the predetermined metrics; the drift of the clock may be part of second considerations. Other combinations and types of metrics may be used as secondary considerations, and the disclosure is not limited to those described above.

Once the method determines a chosen offer in one of steps 308, 312, 316, or 318, the method proceeds to step 320, where the chosen offer is accepted and used. The particular timing service, e.g., 112A, that corresponds to the chosen offer may receive a request service transmission 236 from the local device 122, and in response, the particular timing service, e.g., 112A, then sends a grant service transmission 238 to the local device 122 and begins providing the chosen timing and synchronization services to the local device 122 for use with the private 5G network 124. The method of step 320 may use other messages and signaling to establish the timing and synchronization services from the chosen timing service, e.g., 112A, without departing from the disclosure.

After step 320, the method proceeds to step 322. In step 322, the local device periodically monitors the quality of the chosen timing and synchronization source, and in step 324, a determination is made if the chosen source meets the predetermined metrics. If it does still meet the predetermined metrics, the method returns to step 322 and the chosen source is continued to be used with steps 322 and 324 being repeated.

If, alternatively, the chosen source no longer meets the predetermined metrics and/or a predetermined amount of time passes, the method returns to step 302 and steps 302-324 are repeated in order to allow for periodically choosing the best timing and synchronization services. This is done because, over time, both the needs of the enterprise network 120 may change and/or the quality of the services provided by a particular ISP, e.g., 110A, may change. In one or more embodiments, the predetermined amount of time may be based on the amount of time a particular contract lasts or the frequency in which particular timing services 112A change in quantity and other metrics.

The method may continue until such time as timing services 112A-112N are no longer needed, or changes in the system require user and/or administrator intervention. Although this disclosure describes and illustrates particular steps of method 300 of FIG. 3 as occurring in a particular order, this disclosure contemplates any suitable steps of method 300 of FIG. 3 occurring in any suitable order.

Although this disclosure describes and illustrates an example method for choosing and using a particular timing and synchronization source and provider using the particular steps of the method of FIG. 3, this disclosure contemplates any suitable method for choosing and using a particular timing and synchronization source and provider and optionally indicating it to a user including any suitable steps, which may include all, some, or none of the steps of the method of FIG. 3, where appropriate. Although FIG. 3 describes and illustrates particular components, devices, or systems carrying out particular actions. This disclosure contemplates any suitable combination of any suitable components, devices, or systems carrying out any suitable actions.

Figure 4:
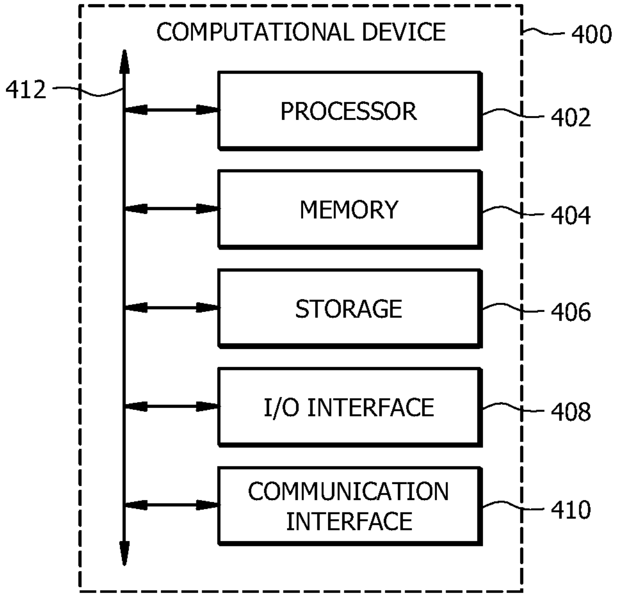
FIG. 4 illustrates a computer architecture diagram shown in an illustrative computer hardware architecture in accordance with at least one embodiment.

FIG. 4 shows an example computer architecture for a computational device 400 capable of executing program components for implementing the functionality described above. The computer architecture shown in FIG. 4 illustrates any type of computational device 400, such as a switch, router, wireless controller, conventional server computer, workstation, desktop computer, laptop, tablet, network appliance, e-reader, smartphone, or other computing device, and may be utilized to execute any of the software components presented herein. The computational device 400 may, in some examples, correspond to any of the devices, such as the local device 122, the private 5G network 124, and user devices 130A as shown in FIG. 1, and/or any other device described herein, and may comprise personal devices (e.g., smartphones, tablets, wearable devices, and laptop devices), networked devices, such as servers, switches, routers, hubs, bridges, gateways, modems, repeaters, access points, and/or any other type of computing device that may be running any type of software and/or virtualization technology.

In particular embodiments, one or more computational devices 400 perform one or more steps of one or more methods described or illustrated herein, such as the methods described with respect to FIG. 3. In particular embodiments, one or more computational devices 400 provide the functionality described or illustrated herein, such as the functionality described with respect to FIGS. 1-3. In particular embodiments, software running on one or computational device 400 performs one or more steps of one or more methods described or illustrated herein or provides functionality described or illustrated herein. Particular embodiments include one or more portions of one or more computational devices 400.

Particular embodiments may include any suitable number of computational devices 400. Computational device 400 may take any suitable physical form. As example and not by way of limitation, computational device 400 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computational device 400 may include one or more computational devices 400; be unitary or distributed; span multiple locations; span multiple machines; span multiple data centers; or reside in a cloud, which may include one or more cloud components in one or more networks.

Where appropriate, one or more computational devices 400 may perform without substantial spatial or temporal limitation one or more steps of one or more methods described or illustrated herein. As an example, and not by way of limitation, one or more computational devices 400 may perform in real-time or in batch mode one or more steps of one or more methods described or illustrated herein. One or more computational devices 400 may perform at different times or at different locations one or more steps of one or more methods described or illustrated herein, where appropriate.

In particular embodiments, computational device 400 includes a processor 402, memory 404, storage 406, an input/output (I/O) interface 408, a communication interface 410, and a bus 412. Although this disclosure describes and illustrates a particular computational device or node having a particular number of particular components in a particular arrangement, particular embodiments may include any suitable computer system having any suitable number of any suitable components in any suitable arrangement.

In particular embodiments, processor 402 includes hardware for executing instructions, such as those making up a computer program. As an example, and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. Processor 402 may include any suitable number of any suitable internal caches, where appropriate.

As an example, and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual address translation for processor 402.

In particular embodiments, processor 402 may include one or more internal registers for data, instructions, or addresses. Processor 402 may include any suitable number of any suitable internal registers, where appropriate. Where appropriate, processor 402 may include one or more arithmetic logic units (ALUs), be a multi-core processor, or include one or more processors 402. Although this disclosure describes and illustrates a particular processor, particular embodiments may include any suitable processor.

In particular embodiments, memory 404 includes main memory for storing instructions for processor 402 to execute or data for processor 402 to operate on. As an example, and not by way of limitation, computational device 400 may load instructions from storage 406 or another source (such as, for example, another computational device 400) to memory 404. Processor 402 may then load the instructions from memory 404 to an internal register or internal cache.

To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere).

One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate access to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where applicable, this RAM may be single-ported or multi-ported RAM. Particular embodiments may include any suitable RAM. Memory 404 may include one or more memories 404, where appropriate. Although this disclosure describes and illustrates a particular memory, particular embodiments may include any suitable memory.

In particular embodiments, storage 406 includes mass storage for data or instructions. As an example, and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to the computational device 400, where appropriate. In particular embodiments, storage 406 is a non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), flash memory, or a combination of two or more of these. Storage 406 may take any suitable physical form.

Storage 406 may include one or more storage control units facilitating communication between processor 402 and storage 406, where appropriate. Where appropriate, storage 406 may include one or more storages 406. Although this disclosure describes and illustrates particular storage, particular embodiments may include any suitable storage.

In particular embodiments, I/O interface 408 includes hardware, software, or both, providing one or more interfaces for communication between a computational device 400 and one or more I/O devices. Computational device 400 may include one or more of these I/O devices, where appropriate. One or more of these I/O devices may enable communication between a person and computational device 400. As an example, and not by way of limitation, an I/O device may include a keyboard, keypad, microphone, monitor, mouse, printer, scanner, speaker, still camera, stylus, tablet, touch screen, trackball, video camera, another suitable I/O device, or a combination of two or more of these. An I/O device may include one or more sensors. Particular embodiments may include any suitable I/O devices, and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, particular embodiments may include any suitable I/O interface. In particular embodiments, I/O interface 408 may include an interface to a remote network management system.

In particular embodiments, communication interface 410 includes hardware, software, or both providing one or more interfaces for communication (such as, for example, packet-based communication) between computational device 400 and one or more other computational devices 400 or one or more networks. As an example, and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network.

Particular embodiments may include any suitable network and any suitable communication interface 410 for it. As an example, and not by way of limitation, computational device 400 may communicate with an ad hoc network, a personal area network (PAN), a LAN, WAN, MAN, or one or more portions of the Internet or a combination of two or more of these. One or more portions of one or more of these networks may be wired or wireless. As an example, computational device 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computational device 400 may include any suitable communication interface 410 for any of these networks, where appropriate. Communication interface 410 may include one or more communication interfaces 410, where applicable. Although this disclosure describes and illustrates a particular communication interface, particular embodiments may include any suitable communication interface.

In particular embodiments, bus 412 includes hardware, software, or both coupling components of the computational device 400 to each other. As an example and not by way of limitation, bus 412 may include an Accelerated Graphics Port (AGP) or other graphics bus, an Enhanced Industry Standard Architecture (EISA) bus, a front-side bus (FSB), an HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, particular embodiments may include any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable, non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

While the disclosure is described with respect to the specific examples, it is to be understood that the scope of the disclosure is not limited to these specific examples. Since other modifications and changes varied to fit particular operating requirements and environments will be apparent to those skilled in the art, the disclosure is not considered limited to the example chosen for purposes of disclosure and covers changes and modifications that do not constitute departures from the true spirit and scope of this disclosure.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed:

1. A method for establishing timing and synchronization services comprising:
- sending, by a local device, a request to a first source of timing and synchronization services and a second source of timing and synchronization services, wherein the local device is connected to the first source and the second source;
- receiving, by the local device, a first offer for timing and synchronization services from the first source and a second offer for timing and synchronization services from the second source;
- comparing, by the local device, the first offer and the second offer to predetermined metrics;
- requesting, by the local device, that the first source provide the timing and synchronization services; and
- receiving, by the local device, the timing and synchronization services from the first source,
- wherein the first source is associated with a first internet service provider (ISP) and the second source is associated with a second ISP.

2. The method of claim 1, wherein the first ISP and the second ISP represent a same ISP.

3. The method of claim 1, wherein the first ISP and the second ISP represent a common ISP.

4. The method of claim 1, further comprising:
- periodically monitoring, by the local device, a quality of the timing and synchronization services being provided by the first source;
- determining, by the local device, that the timing and synchronization services provided by the first source no longer satisfy quality-of-service requirements; and
- sending, by the local device, the request to the first source, the second source, and a third source in response to determining that the timing and synchronization services provided by the first source no longer satisfy quality-of-service requirements.

5. The method of claim 1, wherein the local device is part of a private fifth generation (5G) deployment that provides timing and synchronization services to one or more 5G radios and base stations.

6. The method of claim 1, wherein the predetermined metrics comprise price and quality-of-service requirements.

7. The method of claim 1, wherein the local device is connected to the first source and the second source via wired or optical connections.

8. A local device connected to one or more 5G base stations, the local device comprising, comprising:
- one or more processors; and
- one or more computer-readable non-transitory storage media coupled to the one or more processors that stores instructions operable when executed by the one or more processors to cause the local device to perform a method for establishing timing and synchronization services comprising:
  - sending, by a local device, a request to a first source of timing and synchronization services and a second source of timing and synchronization services, wherein the local device is connected to the first source and the second source;
  - receiving, by the local device, a first offer for timing and synchronization services from the first source and a second offer for timing and synchronization services from the second source;
  - comparing, by the local device, the first offer and the second offer to predetermined metrics;
  - requesting, by the local device, that the first source provide the timing and synchronization services; and
  - receiving, by the local device, the timing and synchronization services from the first source,
- wherein the first source is associated with a first internet service provider (ISP) and the second source is associated with a second ISP.

9. The local device of claim 8, wherein the local device comprises a router or switch.

10. The local device of claim 8, wherein the local device comprises a wireless controller.

11. The local device of claim 8, wherein the first ISP and the second ISP represent a same ISP.

12. The local device of claim 8, wherein the first ISP and the second ISP represent a common ISP.

13. The local device of claim 8, wherein the method for establishing timing and synchronization services performed by the local device further comprises:
- periodically monitoring, by the local device, a quality of the timing and synchronization services being provided by the first source;
- determining, by the local device, that the timing and synchronization services provided by the first source no longer satisfy quality-of-service requirements; and
- sending, by the local device, the request to the first source, the second source, and a third source in response to determining that the timing and synchronization services provided by the first source no longer satisfy quality-of-service requirements.

14. The local device of claim 8, wherein the local device is connected to the first source over one of a wired or optical connection.

15. One or more computer-readable non-transitory storage media embodying instructions that, when executed by a processor, cause the processor to perform operations comprising:

sending, by a local device, a request to a first source of timing and synchronization services and a second source of timing and synchronization services, wherein the local device is connected to the first source and the second source;

receiving, by the local device, a first offer for timing and synchronization services from the first source and a second offer for timing and synchronization services from the second source;

comparing, by the local device, the first offer and the second offer to predetermined metrics;

requesting, by the local device, that the first source provide the timing and synchronization services; and receiving, by the local device, the timing and synchronization services from the first source, wherein the first source is associated with a first internet service provider (ISP) and the second source is associated with a second ISP.

16. The one or more computer-readable non-transitory storage media of claim 15, wherein the first ISP and the second ISP represent a same ISP.

17. The one or more computer-readable non-transitory storage media of claim 15, wherein the first ISP and the second ISP represent a common ISP.

18. The one or more computer-readable non-transitory storage media of claim 15, the operations further comprising:

periodically monitoring, by the local device, a quality of the timing and synchronization services being provided by the first source;

determining, by the local device, that the timing and synchronization services provided by the first source no longer satisfy quality-of-service requirements; and sending, by the local device, the request to the first source, the second source, and a third source in response to determining that the timing and synchronization services provided by the first source no longer satisfy quality-of-service requirements.

19. The one or more computer-readable non-transitory storage media of claim 15, wherein the local device is part of a private fifth generation (5G) deployment that provides timing and synchronization to one or more 5G radios and base stations.

20. The one or more computer-readable non-transitory storage media of claim 15, wherein the predetermined metrics comprise price and quality-of-service requirements.

* * * * *